(12) United States Patent
Lauer et al.

(10) Patent No.: US 7,544,126 B2
(45) Date of Patent: Jun. 9, 2009

(54) DEFLECTOR FOR GRINDING CHAFF IN SWATH MODE

(75) Inventors: Fritz K. Lauer, Krähenberg (DE); Rico Priesnitz, Lebach (DE); Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 368 days.

(21) Appl. No.: 11/412,197

(22) Filed: Apr. 26, 2006

(65) Prior Publication Data

US 2006/0246965 A1     Nov. 2, 2006

(30) Foreign Application Priority Data

Apr. 28, 2005   (DE) .................. 10 2005 019 615

(51) Int. Cl.
*A01F 12/30* (2006.01)
(52) U.S. Cl. .................. 460/111; 460/112; 460/901
(58) Field of Classification Search ................. 460/111, 460/112, 901
See application file for complete search history.

(56) References Cited

U.S. PATENT DOCUMENTS

| 3,712,309 | A  | * | 1/1973 | Schmitz ...................... 460/112 |
| 6,866,580 | B2 | * | 3/2005 | Weichholdt et al. ......... 460/112 |
| 7,001,269 | B2 | * | 2/2006 | Weichholdt .................. 460/112 |

| 2004/0204210 | A1 | 10/2004 | Weichholdt et al. |
| 2004/0242291 | A1 | 12/2004 | Weichholdt |

FOREIGN PATENT DOCUMENTS

| DE | 100 64 356   | 12/2000 |
| DE | 102 56 744   | 12/2002 |
| EP | 0371964 A2   | 6/1986  |
| EP | 0958727 A1   | 4/1999  |
| WO | WO 02/34029  | 5/2002  |

OTHER PUBLICATIONS

Deutz-Fahr Topliner 8XL—Druckvermerk 91 532 01/printed in Germany 9906.
Case IH Cross-Flow—Druckvermerk CF80-D-BR-10/99.
KP 2000 Anbaustrohhäcksler mit einzigartigem Spreugebläse/ Fa. KPAB—Druckvermerk 941523.
European Search Report, Dated Aug. 17, 2006, 4 Pages.
German Search Report dated Sep. 30, 2008, (4 pages).

* cited by examiner

*Primary Examiner*—Alicia M Torres

(57) ABSTRACT

A combine harvester, with a separating mechanism from which a first crop stream can go optionally to a straw chopper in a chopping operating mode or bypass the straw chopper in a straw deposit mode and be placed as a swath on the ground of a field, a cleaning mechanism, from which a second crop residue stream in the chopping mode and in the straw deposit mode can be taken to the straw chopper, and a guide mechanism that is arranged downstream from the straw chopper and can move optionally between a straw depositing position and a chopping position.

5 Claims, 4 Drawing Sheets

DEFLECTOR FOR GRINDING CHAFF IN SWATH MODE

FIELD OF THE INVENTION

The invention concerns a combine harvester, with a separating mechanism from which a first crop stream can go optionally to a straw chopper in a chopping operating mode or bypass the straw chopper in a straw deposit mode and be placed as a swath on the ground of a field, a cleaning mechanism, from which a second crop residue stream in the chopping mode and in the straw deposit mode can be taken to the straw chopper, and a guide mechanism that is arranged downstream from the straw chopper and can move optionally between a straw depositing position and a chopping position, designed to deflect the second crop residue stream in the straw depositing position so that the second crop residue stream is ejected in a different direction than the first crop residue stream, while in the chopping position, the guide mechanism can be arranged so that both crop streams are distributed jointly over the field, essentially for the width of a crop receiving mechanism.

BACKGROUND OF THE INVENTION

DE 100 64 356 A and DE 102 56 744 A describe combine harvesters that can optionally operate in a straw deposit mode and a chopping mode. In the chopping mode, the straw is guided through the straw chopper, and in straw deposit mode it bypasses its rear end and is deposited on the ground as a swath. In both operating modes, the chaff is passed through the straw chopper. In the straw deposit mode, the straw guide plates are placed in a position in which the chaff is distributed across the working width on either side of the swath, but does not reach the region of the swath. In the chopping mode, the straw guide plates are placed in a different position, in which chaff and straw are distributed across the working width of the field.

WO 02/34029 A proposes a combine harvester with a chaff distributor and a straw chopper. The chaff distributor can blow the chaff directly against the straw guide plates, arranged downstream from the straw chopper, so that the chopped straw and the chaff are distributed by the guide plates over the working width. In another operating mode, the straw goes above and bypasses the straw chopper and is deposited as a swath on the field, while the chaff is guided by the chaff distributor along the straw guide plates and is deposited in the field across the working width, at either side of the swath. In additional operating modes, the straw is chopped by the straw chopper and distributed across the working width or deposited in a swath, while the chaff is distributed by the chaff distributor across the working width on either side of the swath. Finally, the possibility is provided of also blowing the chaff into the straw swath in the swath depositing mode.

The brochures "Deutz-Fahr Topliner 8XL," printer's mark 91 532 01 Printed in Germany 9906, "Case IH Cross-Flow," printer's mark CF80-D-BR-10/99, and "KP 2000 Straw Chopper Attachment with unique Chaff Blower" of the KPAB company, printer's mark 941523, describe combine harvesters which can likewise be run in a chopping mode and a straw depositing mode. The straw is either delivered through the straw chopper, chopped up, and distributed across the working width (chopping mode), or is taken behind [the chopper] and deposited in a swath in the field (straw mode). In both operating modes, the chaff is delivered to the straw chopper and distributed over the field by the guide plates arranged downstream from the straw chopper.

In the prior art as described in the brochures of the firms Deutz, Case, and KPAB, the chaff is distributed across the working width of the combine in the straw depositing mode. As a result, a portion of the chaff also gets into the straw, which is undesirable for many application areas, such as horse litter. Furthermore, the air stream provided by the straw chopper blows the straw swath up, so that the straw is distributed over a greater width than is desirable for collection with a baling press. The combine described in WO 02/34029 A does not have these drawbacks, but it requires relatively costly chaff distributors. In the combines of DE 100 64 356 A and DE 102 56 744 A, the straw guide plates have to be adjusted in order to switch between the straw depositing mode and the chopping mode, which proves to be relatively cumbersome.

SUMMARY OF THE INVENTION

The problem underlying the invention is considered to be the providing of an improved combine harvester, not having the above-mentioned drawbacks of the prior art or having fewer of them.

The problem is solved according to the teaching of Claim 1, while the other claims present features which refine the solution in advantageous manner.

It is proposed to place, downstream from the straw chopper, a guide mechanism which can move between a straw depositing position and a chopping position, which in its straw depositing position deflects downward a portion of the second crop stream (chaff) oriented in the direction of the first crop stream being ejected, while the remaining first crop stream (straw) is not affected. In its chopping position, it does not significantly affect the crop stream consisting of straw and chaff.

In this way, there is no need to adjust the straw guide plates between the straw depositing mode and the chopping mode. In the straw depositing mode, the middle portion of the second crop residue stream (i.e., the portion of the chaff which is ejected by the straw chopper in such an angle range that it would come to lie beneath the straw swath) cannot get into the swath, since it is deflected downward and deposited directly on the field. Furthermore, the swath is prevented from being blown upwards. Then, in the chopping mode, when the guide mechanism is placed in an inactive position, i.e., one not noticeably deflecting or influencing the flow of the two crop streams, it has no disruptive action on the distribution of the crop streams.

In one preferred embodiment of the invention, several straw guide plates are arranged side by side downstream from the straw chopper, generally underneath an ejecting hood. The guide mechanism is preferably arranged downstream from the straw guide plates, since sufficient space is available there. The relatively slight distance from the first crop residue stream also prevents particles from the second crop residue stream from being carried by wind into the first crop residue stream.

The guide mechanism is, in particular, a platelike element, extending roughly vertically in the straw depositing position, so as to deflect downward the middle part of the first crop stream, and in the chopping position it is oriented roughly horizontally, so that the two crop streams can flow undisturbed along its bottom side. Between these positions, the guide mechanism can swivel about an axis extending horizontally and transversely to the forward direction of the combine harvester.

It has proven to be advantageous to connect the guide mechanism to an adjustment drive, which can move it between its straw depositing position and chopping position. The adjustment drive can be operated manually or by motor, e.g., by an electric or hydraulic motor. When there is a manual or motorized operation, it is advisable to have a coupling to the elements which optionally guide the first crop residue stream to the straw chopper or bypass it. This coupling can be mechanical, or there can be a suitable actuation of the respective motor.

Preferably, suitable straw guide rakes are used to form the first crop residue stream. These straw guide rakes are not needed in the chopping mode and, because of the danger of injury which they present, they are placed in an inoperative position. It is advisable to couple the drive mechanism of the straw guide rakes with the adjusting drive of the guide mechanism. Then, when the guide mechanism is in the chopping position, the adjusting drive places the straw guide rakes in the inoperative position, and when the guide mechanism is in the straw depositing position the guide rakes are placed in a swath guide position, in which they channel the first crop residue stream to the side.

For this, the guide mechanism can be connected to a shaft, moved by the adjusting drive, on which holding devices for the straw guide rakes provided with fingers are also secured. The holding devices extend transversely to the shaft. Since the angle range of the shaft to be traversed between the swath guide position and the inoperative position of the straw guide rakes is larger than the angle range for adjusting the drive between its chopping position and its straw depositing position, the guide mechanism can have a stop, which interacts with a suitable element joined torsion-proof to the shaft, so as to provide an angle range of the shaft in which there is no movement of the guide mechanism.

BRIEF DESCRIPTION OF THE DRAWINGS

The drawings present one embodiment of the invention, which shall now be described in greater detail. They show.

DESCRIPTION OF THE PREFERRED EMBODIMENT

Figure 1:
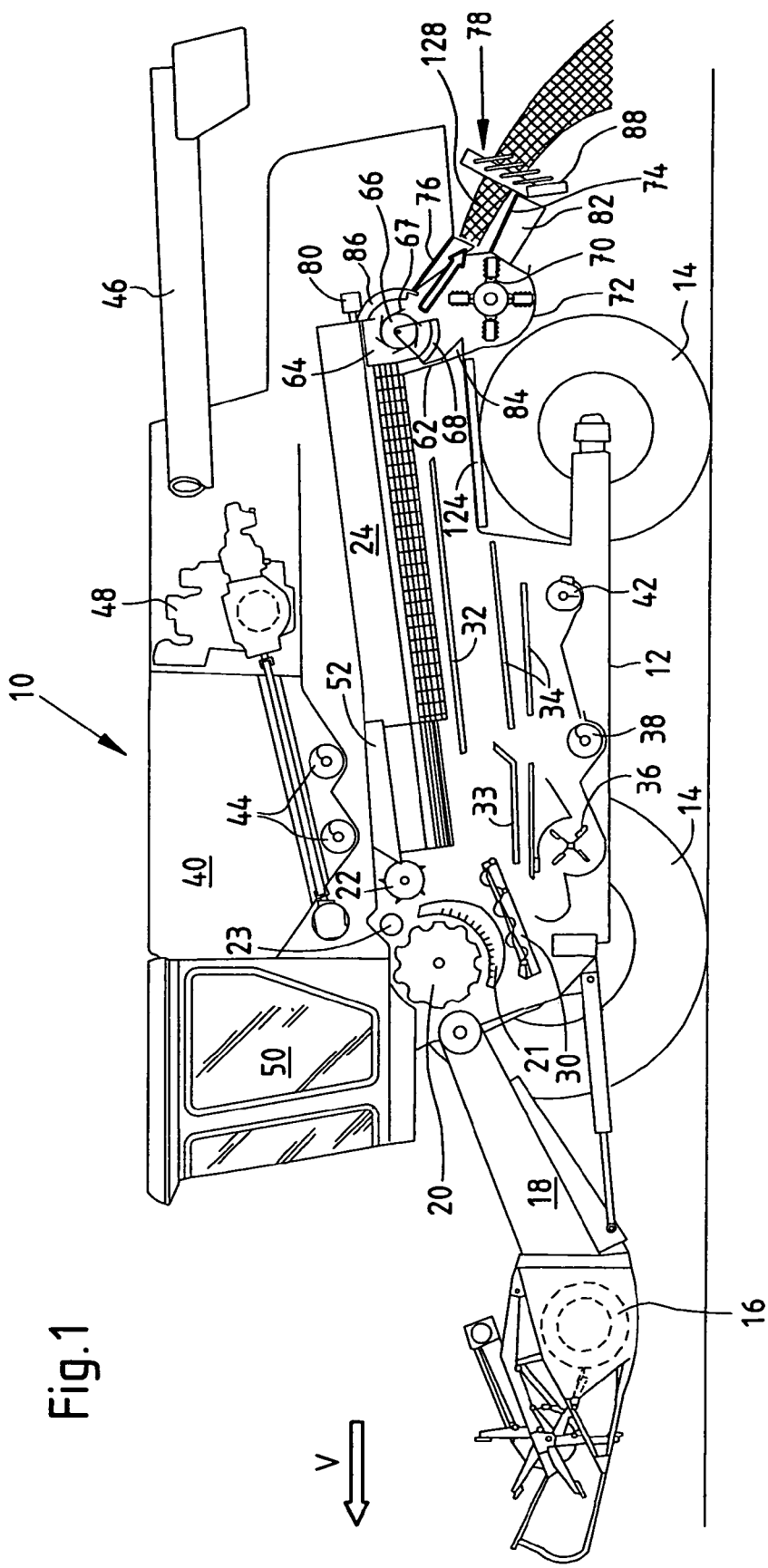
FIG. 1, a schematic side view of a combine harvester with a guide mechanism according to the invention, FIG. 2, a perspective view of the guide mechanism and two straw guide rakes, FIG. 3, a perspective rear view of the rear area of the combine in the chopping mode, and FIG. 4, a perspective rear view of the rear area of the combine in the straw depositing mode.

FIG. 1 shows a self-propelled combine harvester 10 with a frame 12, which is supported on the ground by wheels 14 and moved forward by them. The wheels 14 are caused to turn by drive means not shown, in order to move the combine 10 across a field being harvested, for example.

At the front end region of the combine 10 there is attached a harvesting device 16 in the form of a cutting mechanism, so as to harvest the crop from the field and feed it up and back via a slanted conveyor 18 to threshing and separating means. The threshing and separating means comprise a transversely placed threshing drum 20, associated with a threshing basket 21, to which the harvested crop is first taken. But it is also conceivable to omit the threshing drum 20 and use an axial separator, having a threshing segment and a separating segment. One can use a single axial separator or two (or more) axial separators arranged side by side. A plucking roller 23 and a turnover drum 22 along with a feed housing take the threshed crop from the threshing drum 20 and the threshing basket 21 to the separating mechanism 24 in the form of an axial separator. The separating mechanism 24 is driven at its back side by a gear assembly 80, which connects it to an internal combustion engine 48. One can also use a straw rocker as the separating mechanism 24. Hereinafter, all indicated directions, such as forward, backward, above and below shall refer to the direction of forward motion V of the combine harvester 10.

Grain and chaff that are separated during the threshing process drop onto at least one auger conveyor 30, which takes both of them to a preparation deck 33. Grain and chaff leaving the separating mechanism 24, on the other hand, drop onto a rocking deck 32, which takes them to the preparation deck 33 for further routing. The preparation deck 33 passes on the grain and the chaff to a sifting box 34, associated with a blower 36, in order to support the separation of the chaff from the grain. Cleaned grain is taken by means of a grain auger 38 to an elevator (not shown), which delivers it to a grain tank 40. A return auger 42 takes unthreshed pieces of ears back to the threshing process via another elevator (not shown). The chaff can be ejected at the back of the sifting mechanism by a rotating chaff distributor. The cleaned grain can be unloaded from the grain tank 40 by an unloading system with transverse augers 44 and an unloading conveyor 46.

The above-mentioned systems are driven by means of an internal combustion engine 48 and controlled and guided by an operator from a driver's cabin 50. The various devices for threshing, conveying, cleaning and separating are located inside the frame 12. Outside of the frame 12 is an outer shell, which for the most part can be folded open.

Figure 3:
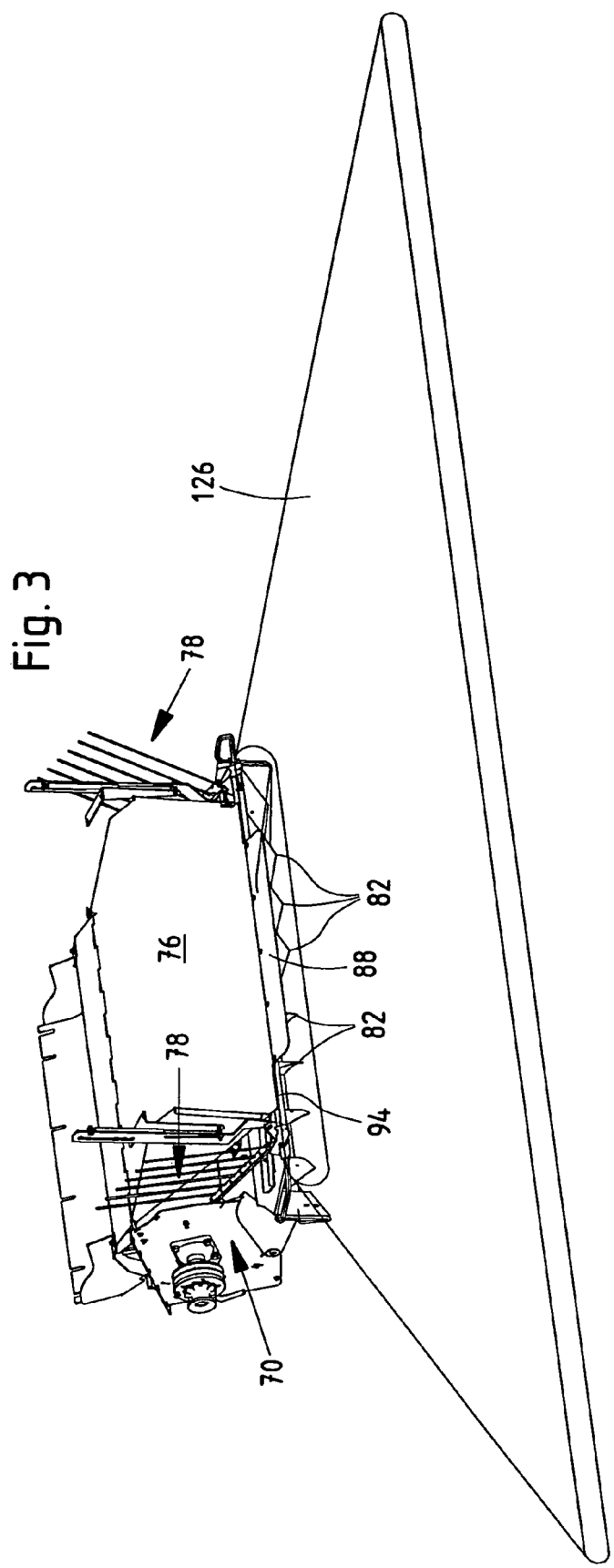

From the separating mechanism 24, unthreshed crop residue (straw) is ejected downward through an outlet 64 at the bottom of the rear end of the housing of the separating mechanism 24, which is closed at its back. Through centrifugal force and gravity, the crop residue drops into a vertical ejection shaft, which is bounded in front by a front wall 62. Beneath the outlet 64 there is arranged an ejection drum 66, about the periphery of which are distributed pusher dogs 67. The ejection drum 66 is enclosed at the back by a rear wall 86. The ejection drum 66 is caused to turn, counterclockwise in FIG. 1, about its lengthwise axis, which extends horizontally and transversely to the direction of travel V. At roughly half the height of the front wall 62, a straw guide element 68 lies against it, somewhat below the axis of rotation of the ejection drum 66 and able to swivel as a whole about the axis of rotation of the ejection drum 66. The straw guide element 68 can swivel about this axis between the straw depositing position shown in FIGS. 1 and 4 and a chopping position (FIG. 3).

Underneath and slightly behind the ejection drum 66 there is a conventional straw chopper 70 arranged in a housing 72, which can be driven in rotation about a horizontal axis running transversely to the direction of travel (counterclockwise in the figure). It comprises a cylindrical body, from which chopping blades are suspended in a floating manner, that cooperates with stationary counterblades arranged in the housing 72 in order to chop up the crop residue and distribute it on the field, roughly across the mowing width of the combine 10, by means of a straw distributing hood 74 outfitted with straw guide blades 82 on its underside.

The straw guide element 68 has concave curvature (a circular arc) and concentrically encloses the ejection drum 66 in an angle range of around 45°. At its outer ends in the transverse direction, it is hinged to swivel about the axis of the ejection drum 66. The straw guide element 68 extends, in the straw depositing position shown in FIG. 1, from the front wall 62 to just above the axis of rotation of the straw chopper 70. In this position, the straw guide element 68 ensures that the threshed crop residue is deposited at a slant downward and backward from the ejection drum 66 beneath an ejection hood 76, located downstream from the rear wall 86, and above the straw distributing hood 74.

In the chopping position, the straw guide element 68 is swiveled back about the axis of rotation of the ejection drum 66 (clockwise in relation to FIG. 1). In this way, an opening is produced between the front wall 62 and the forward edge of the straw guide element 68, through which the crop residue reach the straw chopper 70. The straw guide element 68 in this position prolongs the rear wall 86 downward and forward. In its region below the line against which the straw guide element 68 comes to rest when it is in the straw depositing position, the front wall 62 is likewise provided with guide runners 84 so as to load the straw chopper 70 as uniformly as possible. In the straw chopper 70, the crop residue is chopped up and ejected backward and downward at a slant. Beneath the straw distributing hood 74 arranged at the ejection of the straw chopper 70, there are provided the straw guide plates 82, which dictate the direction in which the crop residue will be deposited on the ground of the field.

Above the rear end of the straw distributing hood 74 extends a straw guide rake 78, which serves to steer the straw in the swath depositing position. Beneath the rear end of the straw distributing hood, downstream from the straw guide plates 82, there is arranged a sheetlike guide mechanism 88, which is depicted in its straw depositing position in FIG. 1, in which it extends roughly vertically downward.

Figure 2:
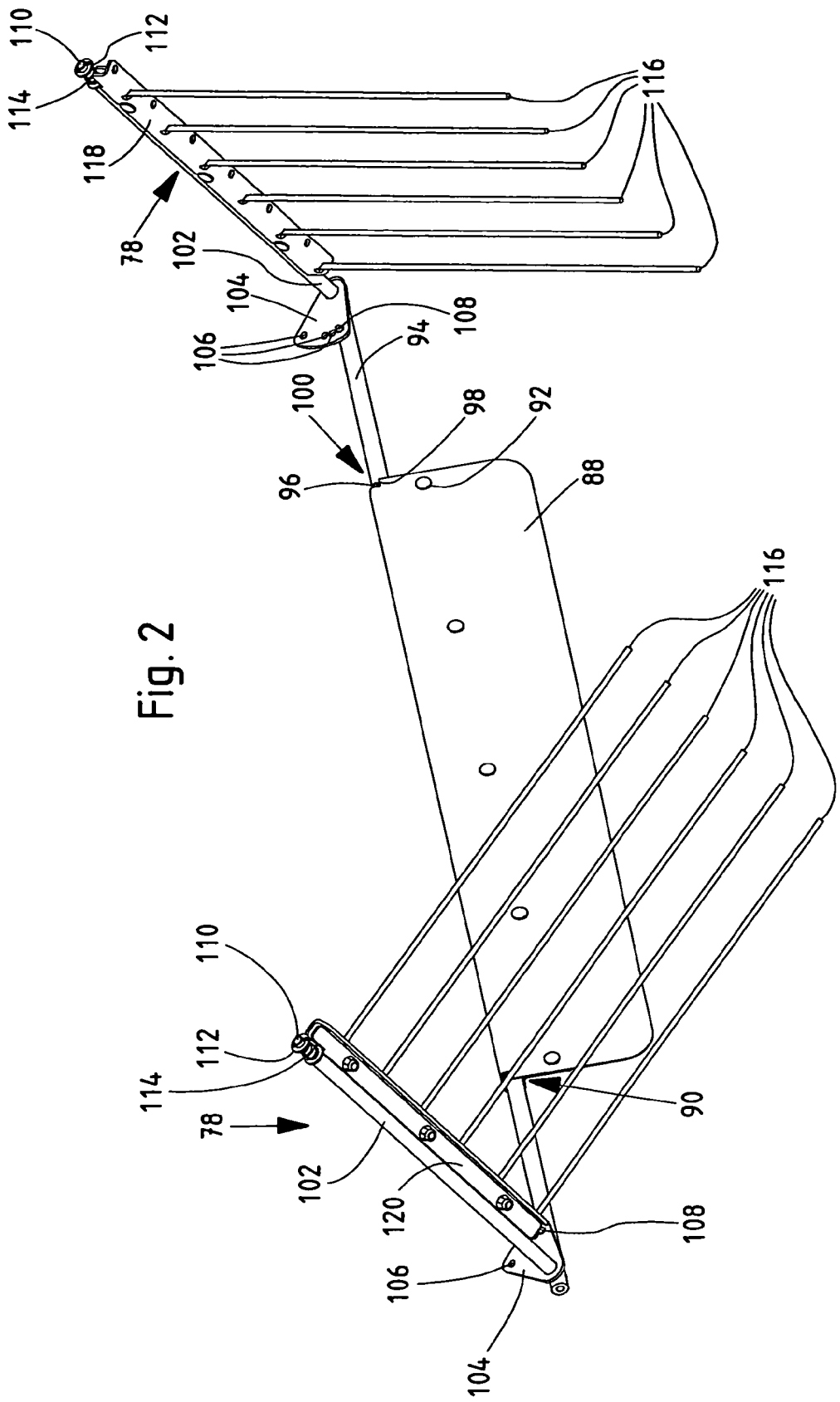

In FIG. 2, the straw guide rake 78 and the guide mechanism 88 are shown in a perspective view. The guide mechanism 88 is a rectangular sheet which is curved so as to produce a hollow channel 90. The surfaces of the sheet on either side of the channel 90 are joined together by screws 92. Through the channel 90 there extends a shaft 94, which is provided with an outwardly projecting element 96 at either end of the channel 90. The element 96 in the chopping position of the guide mechanism 88 depicted in FIG. 2 comes to rest against a stop 98, which is defined by a recess 100 in the guide mechanism 88, and the crop hitting the stop 98 forces it against the element 96. The recess 100 is dimensioned in the peripheral direction of the shaft 94 such that the guide mechanism 88 can turn between the positions shown in FIGS. 3 and 4.

The straw guide rakes 78 each have a holding device 102, extending parallel to each other and transversely to the shaft 94. The holding device 102 has at its lower end a plate 104 furnished with several holes 106. Each of the holes 106 is penetrated by a pin 108, connected to the shaft 94. The shaft 94 and the holding devices 102 are connected by another pin 110 joined to the shaft 94, extending inside the holding device 102 and beyond its upper end, and by a spring 114 arranged between the upper end of the holding device 102 and a disk 112 joined to the other pin 110. In this way, it is possible to lift the holding device 102 off of the shaft 94 against the force of the spring 114, turn it about the lengthwise axis of the holding device 102, and set any one of the holes 106 on the pin 108, so as to adjust the angle of the straw guide rake 78 about the lengthwise axis of the holding device 102 to the particular harvesting conditions, in particular, the volumes of straw.

Each of the holding devices 102 has six fingers 116, which extend through openings in adjustment elements 118 at their ends near the holding device 102 and [through] angle pieces 120 rigidly joined to the holding device 102. The adjustment elements 118 are joined to the angle pieces 120 by screws 122 and after the screws 122 opposite angle pieces 120 are loosened they can be moved along the lengthwise axis of the holding devices 102, resulting in a change of the angle of the fingers 116 relative to the lengthwise axis of the holding device 102. The straw guide rakes 78 are described in DE 10 2004 014 306 A, whose disclosure is incorporated by reference into the present documents.

Figure 4:
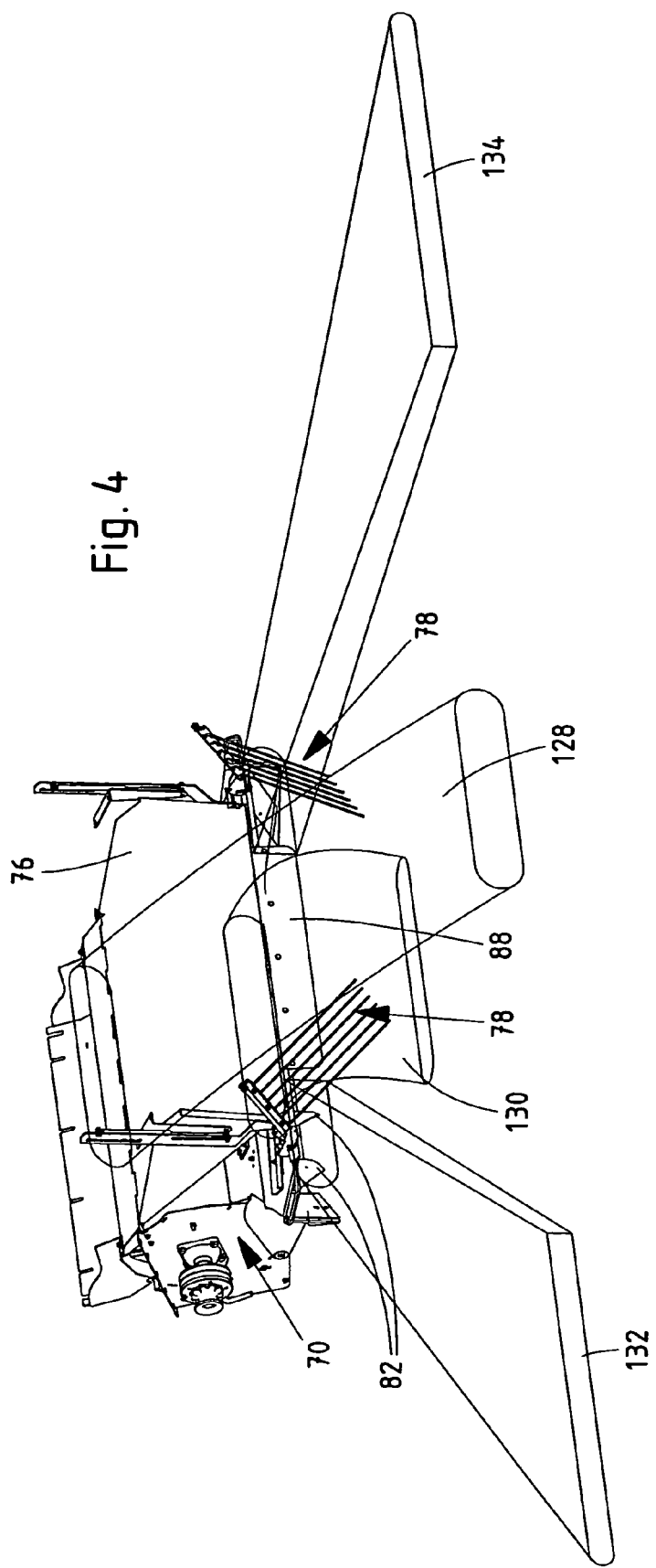

The mounting of the straw guide rake 78 and the guide mechanism 88 on the rear end of the combine 10 can be seen in FIGS. 1, 3 and 4. In FIGS. 1 and 4, the combine 10 is in its straw depositing mode and in FIG. 3 it is in its straw chopping mode. The straw guide element 68 in the straw depositing mode (FIGS. 1 and 4) lets the remaining first crop stream (straw) ejected from the separating mechanism 24 exit at the top of the ejection hood 76 in a swath on the field. The straw guide element 68 in the chopping mode (FIG. 3) causes the remaining first crop stream (straw) ejected from the separating mechanism 24 to enter the straw chopper 70, which chops it up and delivers it along the straw guide plates 82 underneath the ejection hood 76, which distribute it on the field across the working width of the combine 10. The second crop stream (chaff) prepared by the cleaning mechanism 34 is likewise delivered to the straw chopper 70 by a rocking bottom conveyor 124 in both mentioned operating modes and distributed on the field roughly across the working width of the combine 10.

FIG. 3 shows how the shaft 94 extends at the rear of the ejection hood 76 transversely to the forward direction of travel of the combine 10. The shaft 94 is placed manually, by a handle (not shown), into an angular position in which the holding devices 102 of the straw guide rakes 78 extend at a slant forward and upward from the shaft 94, and are locked in this angular position. The fingers 116 are accordingly in an inactive position, in which they present little risk of injury. The guide mechanism 88 is in its chopping position and extends from the shaft 94 backward and downward at a slant, parallel to the ejection hood 76, and does not significantly influence the crop streams 126 ejected from the straw chopper 70.

In FIG. 4, the shaft 94 has been brought by the handle into an angular position in which the holding devices 102 of the straw guide rakes 78 extend backward and upward at a slant from the shaft 94, and are locked in this angular position. The fingers 116 are accordingly in a swath guiding position, in which they form the second crop residue stream 128 ejected at the upper end of the ejection hood 76 into a swath. The guide mechanism 88 is in its straw depositing position and extends roughly vertically downward from the shaft 94. In this way, a middle region 130 of the second crop residue stream, which without the guide mechanism 88 could have gotten into the second crop residue stream 128, goes directly downward onto the ground of the field. Thus, the chaff does not get into the straw to a significant degree. Furthermore, the swath is not blown up by the current of air produced by the straw chopper 70. The width of the guide mechanism 88 is designed so that the outer regions 132, 134 of the second crop residue stream are not deflected or influenced by the guide mechanism 88.

The angular range of the guide mechanism 88 is roughly 60° between the straw depositing position and the chopper position, while the straw guide rakes turn through roughly 90° between their swath guide position and their out of operating position. These different angles are made possible by the elements 96 and the stops 98, which provide for an angular range of the shaft 94 in which the guide mechanism 88 does not move.

Having described the preferred embodiment, it will become apparent that various modifications can be made without departing from the scope of the invention as defined in the accompanying claims.

The invention claimed is:

1. A combine harvester with a separating mechanism from which a first crop stream can go optionally to a straw chopper in a chopping operating mode or bypass the straw chopper in a straw deposit mode and be placed as a swath on the ground of a field, a cleaning mechanism, from which a second crop residue stream in the chopping mode and in the straw deposit mode can be taken to the straw chopper, and a guide mechanism that is arranged downstream from the straw chopper and can move optionally between a straw depositing position and a chopping position, designed to deflect the second crop residue stream in the straw depositing position so that the second crop residue stream is ejected in a different direction than the first crop residue stream, while in the chopping position the guide mechanism can be arranged so that both crop streams are distributed jointly over the field, essentially for the width of a crop receiving mechanism of the combine, characterized in that the guide mechanism is oriented so that in its straw depositing position it deflects downward a portion of the second crop stream oriented in the direction of the first crop stream being ejected, and in its chopping position it does not significantly deflect the flow of the two crop residue streams, said combine harvester characterized in that several straw guide plates are arranged laterally side by side downstream from the straw chopper, and the guide mechanism is arranged downstream from the straw guide plates.

2. The combine harvester according to claim 1, characterized in that the guide mechanism can turn about an axis extending horizontally and transversely to the direction of forward motion of the combine.

3. A combine harvester with a separating mechanism from which a first crop stream can go optionally to a straw chopper in a chopping operating mode or bypass the straw chopper in a straw deposit mode and be placed as a swath on the ground of a field, a cleaning mechanism, from which a second crop residue stream in the chopping mode and in the straw deposit mode can be taken to the straw chopper, and a guide mechanism that is arranged downstream from the straw chopper and can move optionally between a straw depositing position and a chopping position, designed to deflect the second crop residue stream in the straw depositing position so that the second crop residue stream is ejected in a different direction than the first crop residue stream, while in the chopping position the guide mechanism can be arranged so that both crop streams are distributed jointly over the field, essentially for the width of a crop receiving mechanism of the combine, characterized in that the guide mechanism is oriented so that in its straw depositing position it deflects downward a portion of the second crop stream oriented in the direction of the first crop stream being ejected, and in its chopping position it does not significantly deflect the flow of the two crop residue streams and further characterized in that the guide mechanism is connected to an adjustment drive, which enables moving the guide mechanism between its straw depositing position and its chopping position, characterized in that two straw guide rakes are present, each of which is arranged on a different side of the first crop residue stream ejected in the straw depositing mode, and which can move between a swath guide position, in which they collect the first crop residue stream in the straw depositing mode, and an out-of operation position, and the adjustment drive furthermore is connected to the drive mechanism of the straw guide rakes and brings them into the swath guide position when the guide mechanism is in the straw depositing position and into the out-of-operation position when the guide mechanism is in the chopper position.

4. The combine harvester according to claim 3, characterized in that the guide mechanism is coupled to a shaft, connected to the adjustment drive, which can be turned by the adjustment drive about an axis running horizontally and transversely to the direction of travel, and the straw guide rakes each have a holding device with fingers arranged thereon, while the holding devices extend transversely to the shaft and are joined to it torsion-proof in the direction of turning of the shaft.

5. The combine harvester according to claim 4, characterized in that the guide mechanism has a stop, which cooperates with an element of the shaft, so that the range of movement of the guide mechanism is less than that of the straw guide rakes.

* * * * *